US009730172B2

(12) United States Patent
Shibuta et al.

(10) Patent No.: US 9,730,172 B2
(45) Date of Patent: Aug. 8, 2017

(54) BASE STATION DEVICE AND METHOD OF UPDATING COUNTER OF BASE STATION DEVICE

(71) Applicant: Panasonic Intellectual Property Management Co., Ltd., Osaka (JP)

(72) Inventors: Akira Shibuta, Fukuoka (JP); Hiroyuki Ishihara, Fukuoka (JP); Koichi Yamamoto, Fukuoka (JP); Katsunori Takahashi, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 131 days.

(21) Appl. No.: 14/684,057

(22) Filed: Apr. 10, 2015

(65) Prior Publication Data

US 2015/0304975 A1 Oct. 22, 2015

(30) Foreign Application Priority Data

Apr. 18, 2014 (JP) .................. 2014-086487

(51) Int. Cl.
*H04W 4/00* (2009.01)
*H04W 56/00* (2009.01)
*H04J 3/06* (2006.01)

(52) U.S. Cl.
CPC ....... *H04W 56/0015* (2013.01); *H04J 3/0667* (2013.01)

(58) Field of Classification Search
USPC .......... 370/328–350, 508–517; 709/239–248
See application file for complete search history.

(56) References Cited

U.S. PATENT DOCUMENTS 5,530,704 A * 6/1996 Gibbons ............... H04J 3/0685
340/4.2
6,278,718 B1 * 8/2001 Eschholz .............. H04L 12/422
370/503
7,190,703 B1 * 3/2007 Heitmann ........... H04M 7/0066
370/508

(Continued)

FOREIGN PATENT DOCUMENTS

JP 2003-509973 A 3/2003
WO 01/20889 A1 3/2001

*Primary Examiner* — Man Phan
(74) *Attorney, Agent, or Firm* — Seed IP Law Group LLP (57) ABSTRACT

There is provided a base station device capable of achieving synchronization in a wired manner between base station devices in IP-DECT. Thus, according to the base station device, in slave base station devices, synchronization control unit hardware that is connected to Ethernet (registered trademark), and outputs timestamp information and synchronization pulses which includes interval pulses and wide pulses, synchronization control unit software that generates frame numbers based on the timestamp information, and a wireless timing control unit that receives the synchronization pulses generated in the synchronization control unit hardware and the frame numbers generated in the synchronization control unit software, and performs timing control for performing wireless communication with IP-DECT client terminals are provided. The wireless timing control unit includes a frame counter, and the frame counter is updated using the frame numbers with the wide pulses as triggers.

10 Claims, 11 Drawing Sheets

(56) References Cited

U.S. PATENT DOCUMENTS

| | | | | |
|---|---|---|---|---|
| 8,374,163 B2* | 2/2013 | Horn | H04J 3/0679 |
| | | | 370/347 |
| 8,446,896 B2* | 5/2013 | Bedrosian | H04J 3/0667 |
| | | | 370/348 |
| 8,473,638 B2* | 6/2013 | Aweya | H04J 3/0667 |
| | | | 709/203 |
| 8,705,509 B2* | 4/2014 | Kuwabara | H04W 56/0015 |
| | | | 370/252 |
| 9,210,015 B2* | 12/2015 | Scherr | H04L 25/4902 |
| 9,386,548 B2* | 7/2016 | Ishihara | H04W 56/00 |
| 9,407,388 B2* | 8/2016 | Grenabo | H04J 3/0638 |
| 2007/0008993 A1* | 1/2007 | Cha | H04J 3/0664 |
| | | | 370/509 |
| 2008/0175207 A1* | 7/2008 | Lee | G06F 21/10 |
| | | | 370/337 |
| 2009/0276542 A1* | 11/2009 | Aweya | H04J 3/0667 |
| | | | 709/248 |
| 2010/0142510 A1* | 6/2010 | Park | H04W 74/04 |
| | | | 370/345 |
| 2011/0261917 A1* | 10/2011 | Bedrosian | H04J 3/0667 |
| | | | 375/371 |
| 2015/0304974 A1* | 10/2015 | Shibuta | H04W 56/0015 |
| | | | 370/338 |
| 2015/0304975 A1* | 10/2015 | Shibuta | H04W 56/0015 |
| | | | 370/328 |

* cited by examiner

BASE STATION DEVICE AND METHOD OF UPDATING COUNTER OF BASE STATION DEVICE

BACKGROUND OF THE INVENTION

1. Field of the Invention

The present invention relates to a preferred base station device and a method of updating a counter of the base station device using a communication system conforming to IEEE 1588 version 2 which is a protocol used to achieve synchronization between devices via a local network such as Ethernet (registered trademark).

2. Description of the Related Art

In a multi-cell digital enhanced cordless telecommunications (DECT) system, in order to seamlessly conduct handover to a slave terminal, it is necessary to achieve precise timing synchronization between base station devices. In a communication system prior to the advent of internet protocol (IP), synchronization was achieved in a wired manner. However, in IP-DECT, since communication is performed through asynchronous Ethernet (registered trademark), air synchronization is achieved not in a wired manner but in a wireless manner.

The IEEE 1588 version 2 defines that when synchronization is established between a base station device as master and a base station device as a slave, a message "Sync" is transmitted from the master base station device every second.

A technology in which synchronization is established using a local network such as Ethernet (registered trademark) has been known. For example, Japanese Patent Unexamined Publication (Translation of PCT Application) No. 2003-509973 describes a method of achieving synchronization between a plurality of base stations over a mobile communication network. Such a synchronization method of the base stations is a method of achieving synchronization between a plurality of base stations over a mobile communication network. In the synchronization method, time information is transmitted to the plurality of base stations via a local network (LAN), and a clock generator of each of the base stations that receives the time information is adjusted based on time information content of the time information and a reception time, and transmission of a functional sequence related to a wireless time frame is controlled with respect to each base station based on a signal from the clock generator.

However, in order to implement a seamless handover to an IP-DECT client terminal, it is necessary to achieve precise timing synchronization and DECT frame number synchronization between the base station devices in the multi-cell DECT. In the IP-DECT, since communication is performed through the asynchronous Ethernet, synchronization is achieved not in a wired manner but in a wireless manner. However, since the distance between the base station devices is short in the synchronization in the wireless manner, there is a problem in that the number of base station devices is increased, and thus, it may be difficult to provide the base station devices.

SUMMARY OF THE INVENTION

In view of the foregoing, it is an object of the invention to provide a base station device and a method of updating a counter of the base station device capable of achieving timing synchronization and DECT frame number synchronization between base station devices in IP-DECT in a wired manner.

According to an aspect of the present invention, there is provided a base station device including: a synchronization control unit that is connected to a network, and outputs timestamp information and synchronization pulses including interval pulses and trigger pulses having a pulse width different from that of the interval pulses; a frame number generating unit that generates frame numbers based on the timestamp information; and a wireless timing control unit that receives the synchronization pulses and the frame numbers, and performs timing control for performing wireless communication with a slave terminal. The wireless timing control unit includes a frame counter, and the frame counter is updated using the frame numbers with the trigger pulses included in the synchronization pulses as triggers.

According to another aspect of the present invention, there is provided a method of updating a counter of a base station device. The method including: outputting timestamp information and synchronization pulses including interval pulses and trigger pulses having a pulse width which is different from that of the interval pulses; generating frame numbers based on the timestamp information; and receiving the synchronization pulses and the frame numbers, and performing timing control for performing wireless communication with a slave terminal. A frame counter related to the performing of the timing control is updated using the frame numbers with the trigger pulses included in the synchronization pulses as triggers.

According to the present invention, since synchronization between base station devices in IP-DECT can be achieved in a wired manner, it is possible to reduce the number of base station devices by increasing the distance between base station devices, and it is possible to easily provide the base station devices.

DETAILED DESCRIPTION OF THE PREFERRED EMBODIMENT

Hereinafter, a preferred exemplary embodiment for implementing the present invention will be described in detail with reference to the drawings.

Exemplary Embodiment

Figure 1:
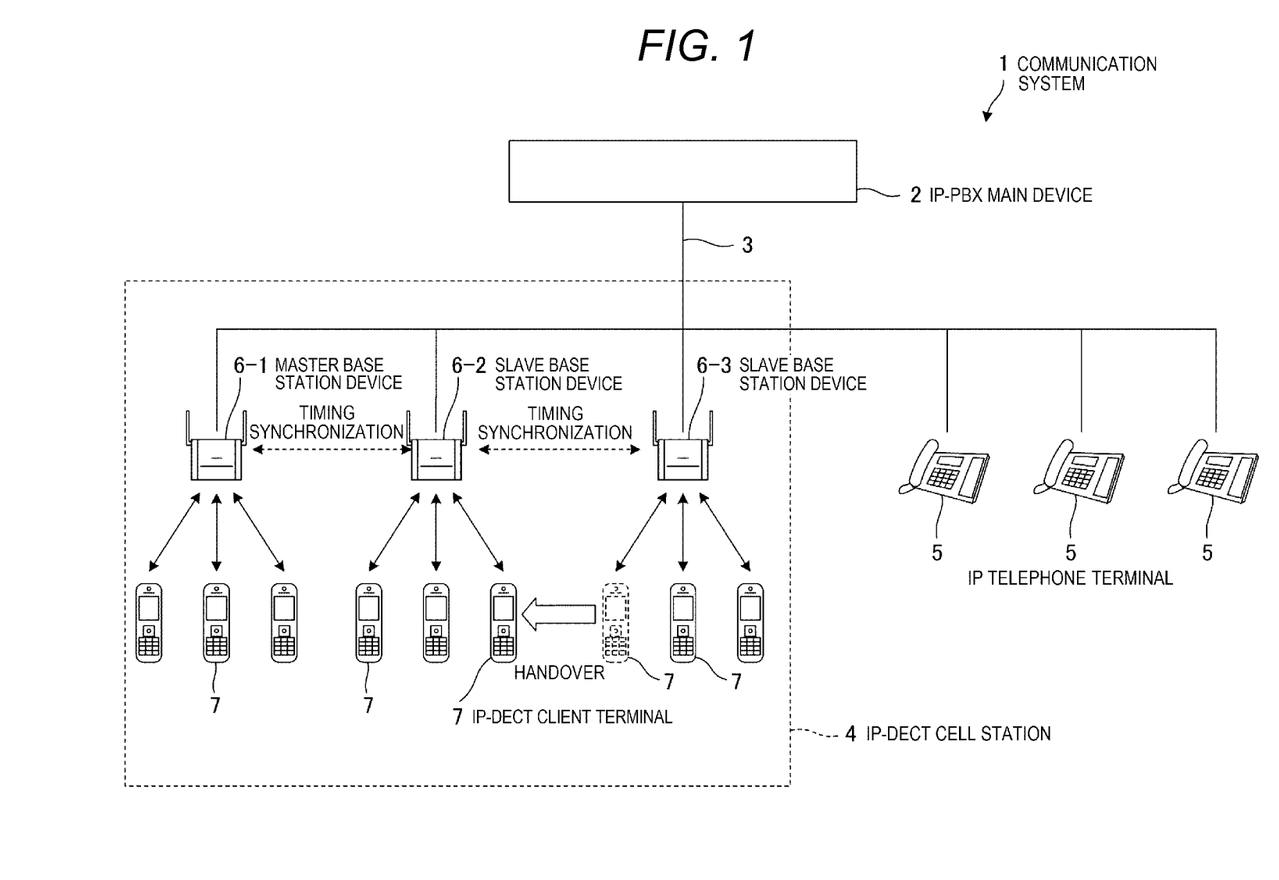
FIG. 1 is a diagram showing a schematic configuration of a communication system according to an exemplary embodiment of the present invention.

FIG. 1 is a diagram showing a schematic configuration of a communication system according to an exemplary embodiment of the present invention. In this drawing, communication system 1 according to the present exemplary embodiment includes IP-private branch exchanges (PBX) main device 2 which is a switching device, IP-DECT cell station 4 connected to IP-PBX main device 2 via Ethernet (registered trademark) 3 in a wired manner, and IP telephone terminals 5 connected to IP-PBX main device 2 via Ethernet (registered trademark) 3 in a wired manner. IP-DECT cell station 4 includes three base station devices 6-1 to 6-3 allowing IP-DECT client terminals 7 to perform wireless communication.

Since the three base station devices 6-1 to 6-3 of IP-DECT cell station 4 are connected to Ethernet (registered trademark) 3, communication with IP-PBX main device 2 and communication between base station devices 6-1 to 6-3 can be performed. In the present exemplary embodiment, among the three base station devices 6-1 to 6-3, base station device 6-1 is set as a master, and remaining two base station devices 6-2 and 6-3 are set as slaves. The setting of the master or slave to three base station devices 6-1 to 6-3 is performed by IP-PBX main device 2. Synchronization between master base station device 6-1 and slave base station devices 6-2 and 6-3 is achieved via Ethernet (registered trademark) 3 such that IP-DECT client terminals 7 seamlessly communicate with these base station devices 6-1 to 6-3 (that is, communication is performed without being disconnected). In the present exemplary embodiment, although it is stated that the number of base station devices in IP-DECT cell station 4 is three, the present invention is not limited to the above-mentioned number.

Figure 2:
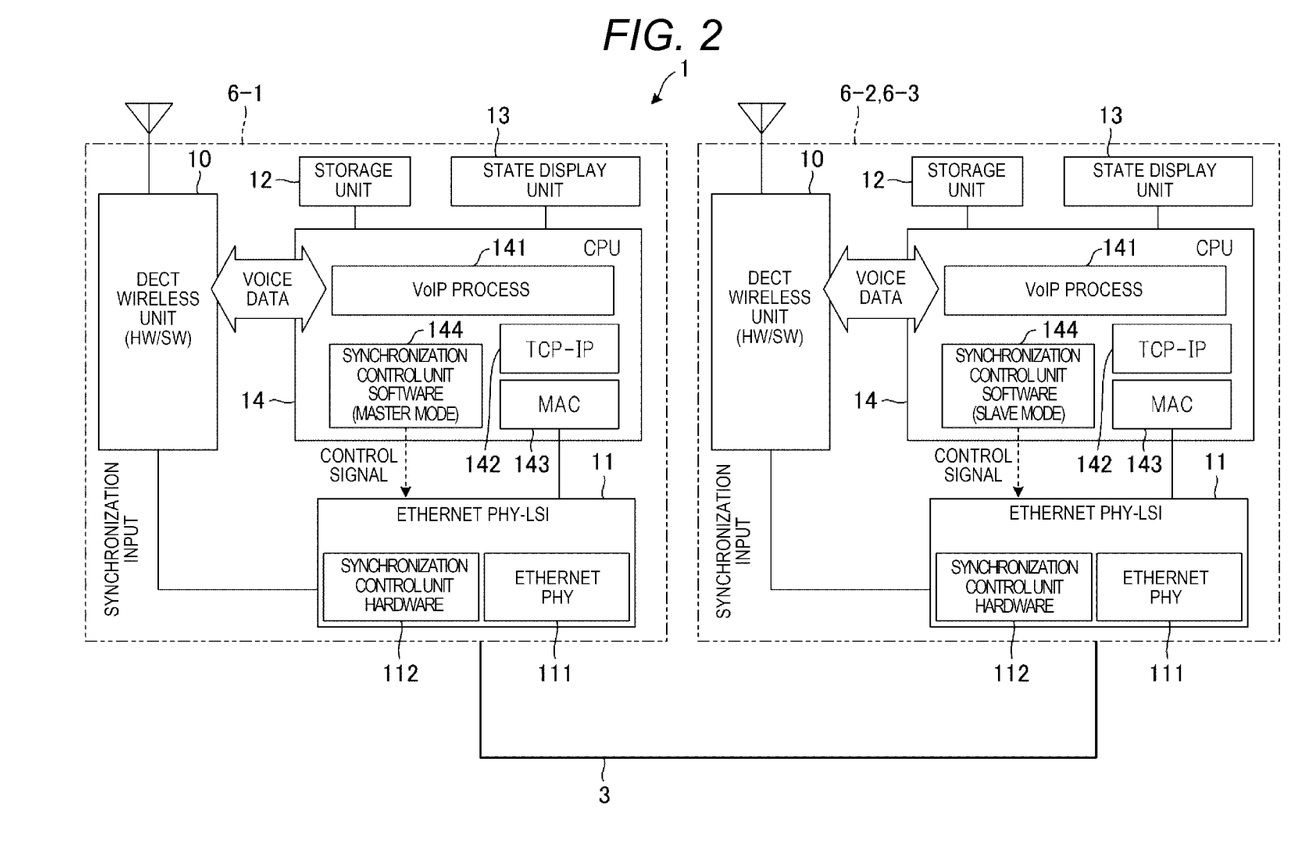
FIG. 2 is a block diagram showing schematic configurations of a master base station device and a slave base station device of the communication system of FIG. 1.

FIG. 2 is a block diagram showing schematic configurations of master base station device 6-1 and slave base station devices 6-2 and 6-3 of communication system 1 of FIG. 1. As shown in the drawing, master base station device 6-1 and slave base station devices 6-2 and 6-3 have the same configuration, and have a difference in that the base station device is set as a master or a slave in terms of software. Since the present invention describes effects obtained when the base station device is set as the slave, slave base station device 6-2 is described as an example.

Slave base station device 6-2 includes DECT wireless unit 10, Ethernet (registered trademark) physical layer (PHY)-large scale integration (LSI) 11, storage unit 12, state display unit 13, and central processing unit (CPU) 14. DECT wireless unit 10 is implemented as hardware (HW) and software (SW) for performing DECT wireless communication with IP-DECT client terminals 7 shown in FIG. 1. Ethernet PHY-LSI 11 includes Ethernet (registered trademark) PHY 111, and synchronization control unit hardware (synchronization control unit) 112. CPU 14 includes voice over internet protocol (VoIP) process 141, transmission control protocol (TCP)-internet protocol (IP) 142, media access control (MAC) 143, and synchronization control unit software (frame number generating unit) 144.

VoIP process 141 of CPU 14 converts bidirectional voice data which is wirelessly communicated with IP-DECT client terminal 7 into a VoIP packet. TCP-IP 142 and MAC 143 of CPU 14 and Ethernet PHY 111 of Ethernet PHY-LSI 11 are layers allowing the VoIP packet to communicate with another VoIP device via Ethernet (registered trademark). Synchronization control unit hardware 112 of Ethernet PHY-LSI 11 is a hardware accelerator conforming to IEEE 1588 version 2, and has a hardware function for synchronizing the timestamp (time information) and the clock rate therein with a timing master using the IEEE 1588 version 2 protocol.

Synchronization control unit software 144 of CPU 14 is software for achieving synchronization using IEEE 1588 version 2 protocol by controlling synchronization control unit hardware 112 of Ethernet PHY-LSI 11 (by applying a control signal). Synchronization control unit software 144 has two modes which are a master mode and a slave mode. In the present exemplary embodiment, the master mode is set to synchronization control unit software 144 of master base station device 6-1, and the slave mode is set to synchronization control unit software 144 of each of slave base station devices 6-2 and 6-3. Storage unit 12 is used to store network condition data in master base station device 6-1 and slave base station devices 6-2 and 6-3. State display unit 13 is used for displaying an examined result (LED).

Next, the exchange of a synchronization message between master base station device 6-1 and slave base station devices 6-2 and 6-3 will be described.

Figure 11:
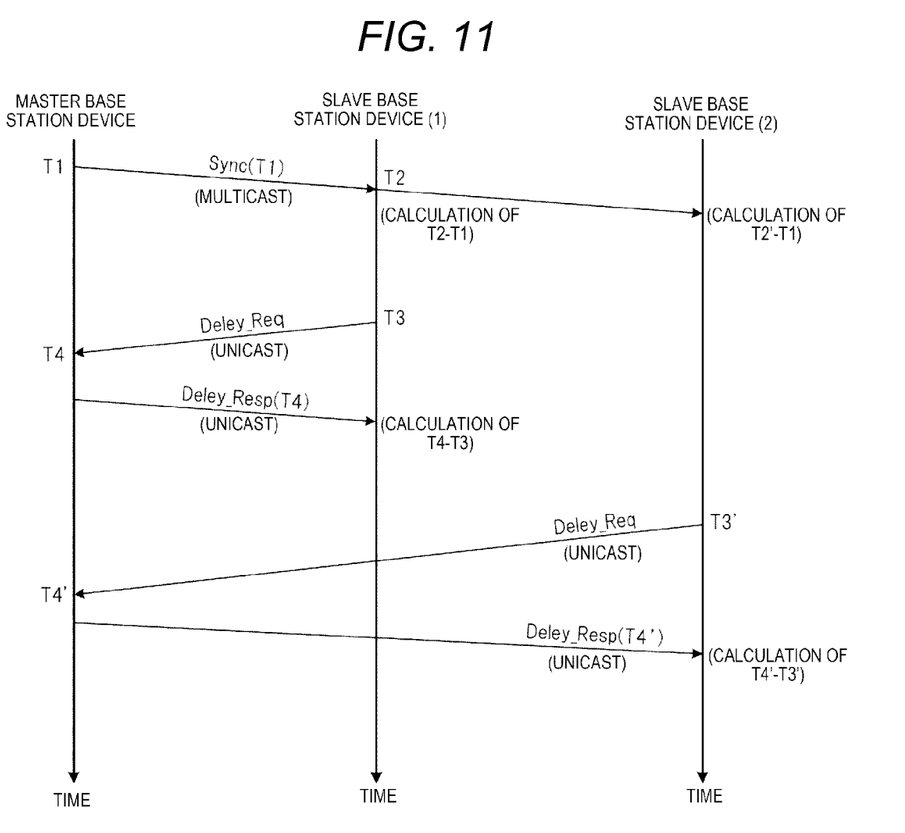
FIG. 11 is a sequence diagram showing the exchange of a synchronization message between one master base station device and two slave base station devices.

FIG. 11 is a sequence diagram showing the exchange of a synchronization message between one master base station device and two slave base station devices. The master base station device and slave base station devices (1) and (2) are connected to each other via Ethernet (registered trademark). The master base station device of FIG. 11 corresponds to base station device 6-1, slave base station device (1) of FIG. 11 corresponds to base station device 6-2, and slave base station device (2) corresponds to base station device 6-3.

First, the master base station device transmits Sync (T1) to slave base station devices (1) and (2). When receiving Sync (T1), slave base station device (1) calculates the difference (T2−T1) between Sync (T1) and reception time T2, and transmits a message of Delay_Req to the master base station device at time T3. When receiving Delay_Req from slave base station device (1), the master base station device transmits a message of Delay_Resp (T4) of reception time T4 to slave base station device (1). When receiving Delay_Resp (T4), slave base station device (1) calculates the difference (T4−T3) between transmission time (T3) of Delay_Req and reception time (T4) of Delay_Req in the master base station device. That is, the delay time of Delay_Req between the master base station device and slave base station device (1) is calculated.

Similarly to slave base station device (1), when receiving Sync (T1), slave base station device (2) calculates a difference (T2'−T1) between Sync (T1) and reception time T2', and transmits Delay_Req to the master base station device at time T3'. When receiving Delay_Req from slave base station device (2), the master base station device transmits Delay- _Resp (T4') of reception time T4' to slave base station device (2). When receiving Delay_Resp (T4'), slave base station device (2) calculates the difference (T4'–T3') between transmission time (T3') of Delay_Req and reception time (T4') of Delay_Req in the master base station device. That is, the delay time of Delay_Req between the master base station device and slave base station device (2) is calculated. The exchange of the synchronization message between master base station device 6-1 and slave base station devices 6-2 and 6-3 has been described.

Figure 3:
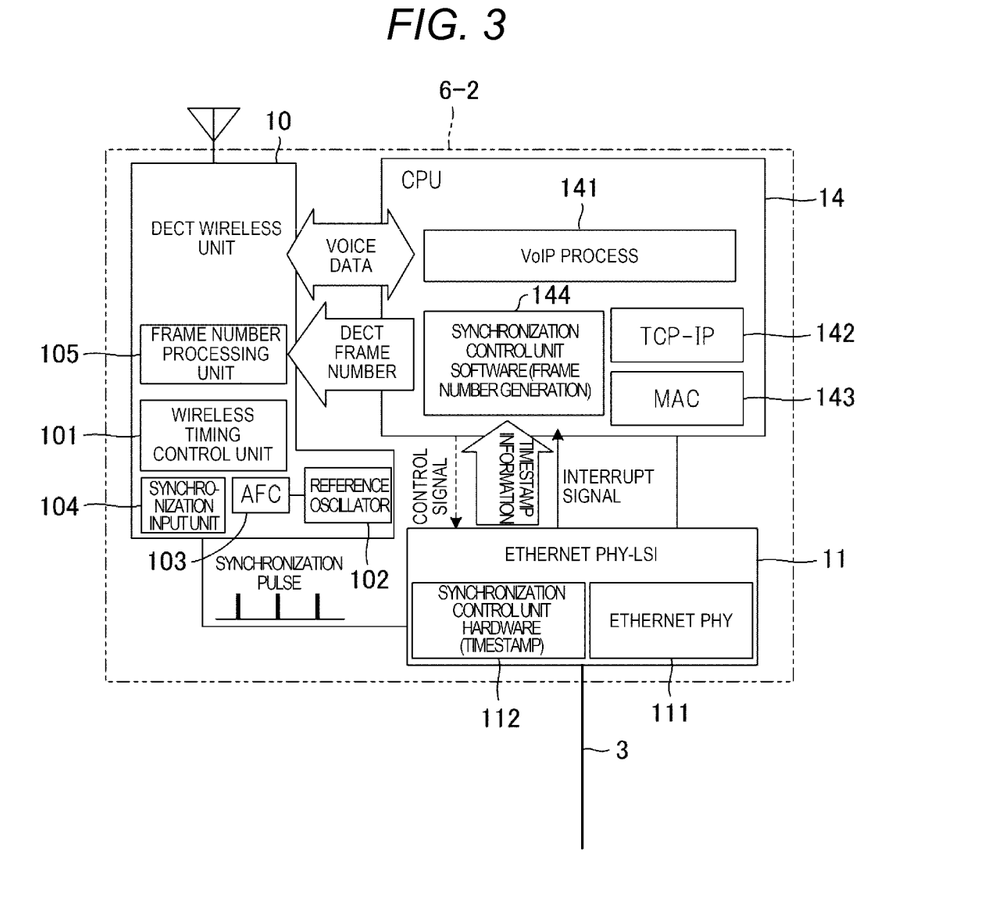
FIG. 3 is a block diagram for describing timing synchronization control in the slave base station device of the communication system of FIG. 1.

FIG. 3 is a block diagram for describing timing synchronization control in slave base station device 6-2 of communication system 1 shown in FIG. 1. In this drawing, synchronization control unit hardware 112 of Ethernet PHY-LSI 11 outputs, as synchronization pulses, head timings of each DECT frame to synchronization input unit 104 of DECT wireless unit 10, and achieves precise synchronization of the bit timing of the hardware.

Figure 4:
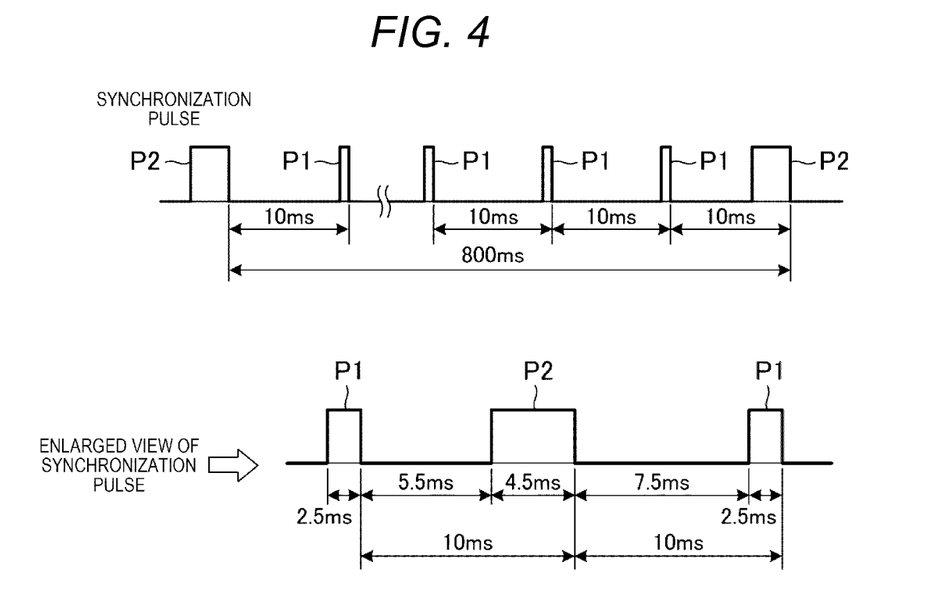
FIG. 4 is a diagram showing synchronization pulses used in the slave base station device of the communication system of FIG. 1 and an enlarged portion of the synchronization pulses.

FIG. 4 is a diagram showing synchronization pulses used in slave base station device 6-2 of communication system 1 of FIG. 1 and an enlarged portion of the synchronization pulses. The synchronization pulses shown in the drawing include interval pulses P1 having a pulse width of 2.5 msec, and wide pulses P2 having a pulse width of 4.5 msec, and are output every 10 msec. Interval pulses P1 forcibly reset a bit counter (to be described below) of wireless timing control unit 101, and increase a frame counter (to be described below) by +1. Wide pulses P2 serve as triggers allowing frame number processing unit 105 to update the frame counter of wireless timing control unit 101. The wide pulses serving as the trigger for updating the frame counter are generated every 80 frames.

In FIG. 3, synchronization control unit hardware 112 outputs timestamp information (time information) to synchronization control unit software 144 of CPU 14 every 10 msec. Synchronization control unit software 144 of CPU 14 generates DECT frame numbers every 80 frames and outputs the generated DECT frame numbers to DECT wireless unit 10 by inputting the timestamp information from synchronization control unit hardware 112 of Ethernet PHY-LSI 11.

Figure 5:
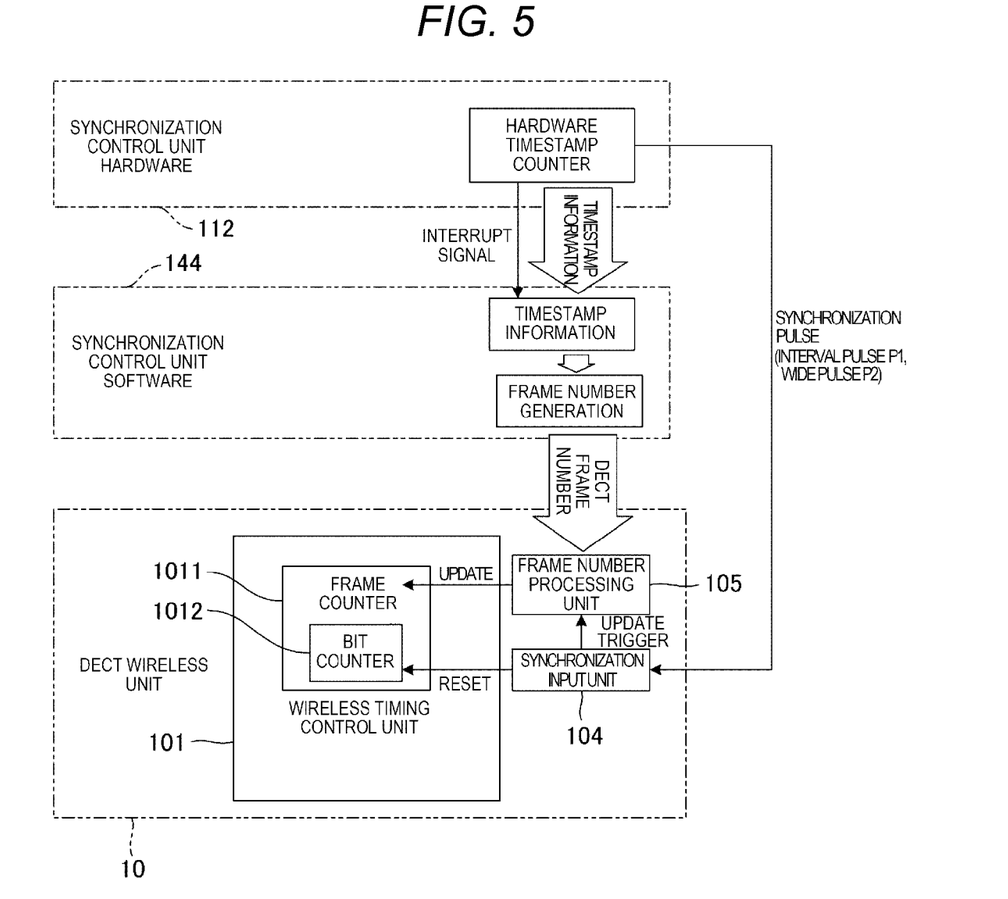
FIG. 5 is a diagram for describing a flow of synchronization between a bit counter and a frame counter of a wireless timing control unit of the slave base station device of the communication system of FIG. 1.

DECT wireless unit 10 includes wireless timing control unit 101, reference oscillator 102, automatic frequency control (AFC) 103, and synchronization input unit 104. Wireless timing control unit 101 performs timing control for performing DECT wireless communication. Wireless timing control unit 101 includes two counters operated using a reference clock. As will be described below, as shown in FIG. 5, among the two counters, one is bit counter 1012, and the other one is frame counter 1011. Bit counter 1012 is provided within frame counter 1011. 1 bit=868 nsec, and bit counter 1012 is a counter that returns to zero at 11520 bits (in this case, frame counter 1011 is increased by +1). 1 frame=10 msec=11520 bits, and frame counter 1011 is a counter that returns to zero at the twenty-eighth power of 2 (that is, $2^{28}$) frames. The reference clock is generated in reference oscillator 102, and is obtained through frequency fine tuning of AFC 103. Bit counter 1012 and frame counter 1011 continue to operate through reference oscillator 102 and AFC 103 even when the synchronization pulses are not input.

Synchronization input unit 104 receives the synchronization pulses output from synchronization control unit hardware 112 of Ethernet PHY-LSI 11, and determines two types of pulses of interval pulses and wide pulses. Frame number processing unit 105 receives the DECT frame numbers from synchronization control unit software 144 of CPU 14 with the detection of the wide pulses by synchronization input unit 104 as a trigger, and updates frame numbers of wireless timing control unit 101. AFC 103 feeds back a bit timing deviation of the synchronization pulses, finely tunes a frequency of reference oscillator 102, and synchronizes the tuned frequency with a frequency of reference oscillator 102 of master base station device 6-1.

FIG. 5 is a diagram for describing a flow of synchronization between the frame counter and the bit counter of wireless timing control unit 101 of slave base station device 6-2 of communication system 1 of FIG. 1. In this drawing, synchronization control unit hardware 112 of Ethernet PHY-LSI 11 includes a timestamp counter having a hardware configuration. The timestamp is synchronized with a timestamp in master base station device 6-1. Synchronization control unit hardware 112 outputs timestamp information of the timestamp counter to synchronization control unit software 144. In this case, synchronization control unit hardware 112 outputs an interrupt signal to synchronization control unit software 144 prior to the output of the timestamp information. Synchronization control unit hardware 112 generates the synchronization pulses and outputs the generated synchronization pulses to synchronization input unit 104 of DECT wireless unit 10. Synchronization input unit 104 of DECT wireless unit 10 generates update triggers by detecting wide pulses P2 among the synchronization pulses, and outputs the generated update triggers to frame number processing unit 105.

Synchronization control unit software 144 of CPU 14 receives the timestamp information output from synchronization control unit hardware 112 of Ethernet PHY-LSI 11, and generates the frame numbers based on the received timestamp information. The generated frame numbers are output to DECT wireless unit 10, as the DECT frame numbers. Frame number processing unit 105 of DECT wireless unit 10 updates frame counter 1011 of wireless timing control unit 101 by using the DECT frame numbers output from synchronization control unit software 144 of CPU 14 at the time that the update triggers are output from synchronization input unit 104.

In the flow during which synchronization control unit hardware 112 of Ethernet PHY-LSI 11 generates the timestamp information and frame number processing unit 105 of DECT wireless unit 10 processes the frame numbers, there is a concern that a deviation due to delay may occur. In order to prevent the deviation due to the delay from occurring, a long updating cycle is set to frame counter 1011 of wireless timing control unit 101 (in the present exemplary embodiment, "80 frames"). In order to set this updating cycle, the wide pulses are generated as the update triggers.

Synchronization input unit 104 of DECT wireless unit 10 resets bit counter 1012 within frame counter 1011 of wireless timing control unit 101 by using the synchronization pulses output from synchronization control unit hardware 112 in addition to outputting the update triggers to frame number processing unit 105. As stated above, the synchronization pulses are used to reset bit counter 1012 of wireless timing control unit 101, and are used to update a value of frame counter 1011 of wireless timing control unit 101.

Figure 6:
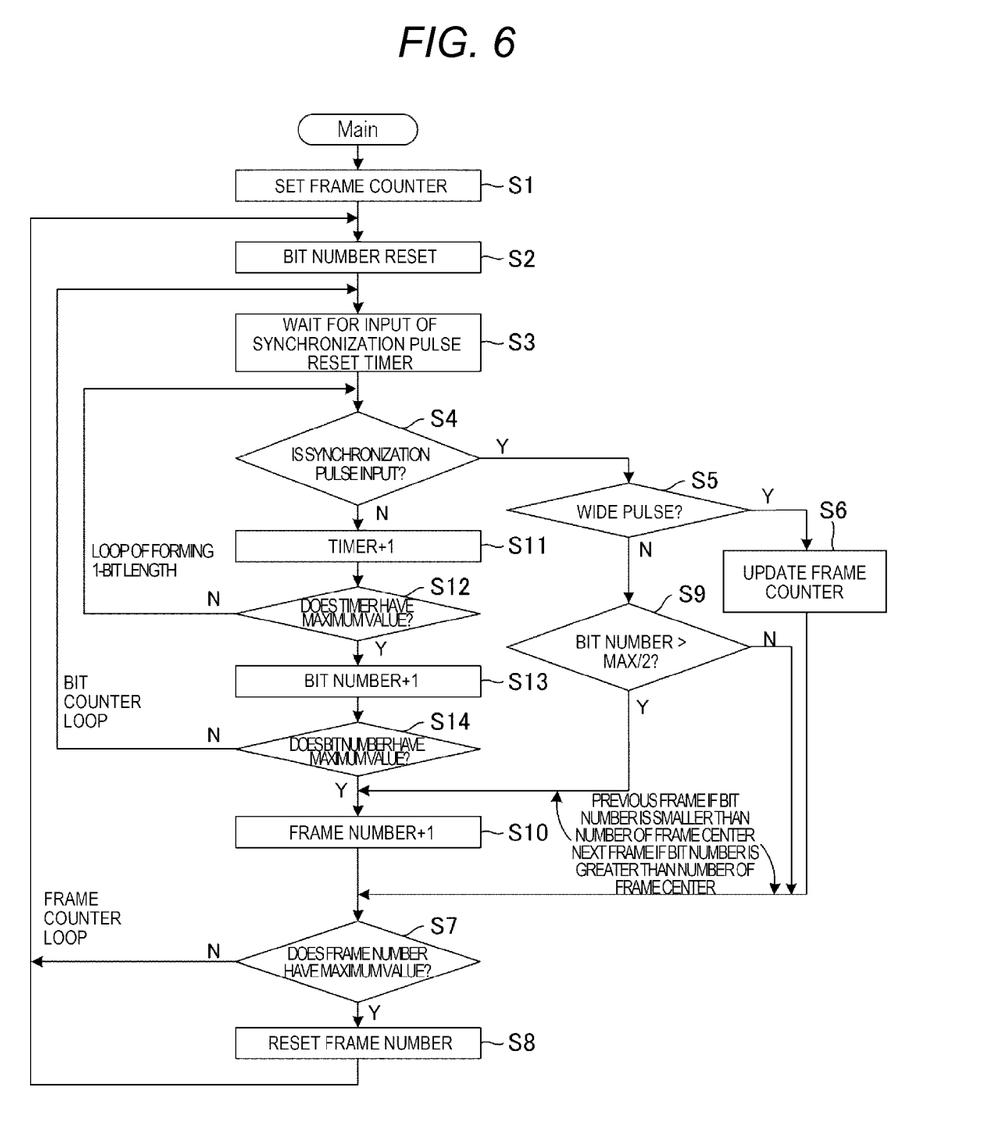
FIG. 6 is a flowchart for describing an operation of a DECT wireless unit of the slave base station device of the communication system of FIG. 1.

FIG. 6 is a flowchart for describing an operation of DECT wireless unit 10 of slave base station device 6-2 of communication system 1 of FIG. 1. In this drawing, the initial value of the frame number is set in frame counter 1011 at the time of synchronization establishment (step S1). That is, the initial value of the frame number generated by software with the timestamp as a base is set in frame counter 1011 of DECT wireless unit 10 at the time of synchronization establishment. The initial value of the frame number is typically zero (0). Frame counter 1011 counts up the frame numbers, but is regularly updated at wide pulses P2 of the synchronization pulses in order to provide for contingencies.

After the initial value of the frame number is set to frame counter 1011, the bit number is reset (step S2). That is, a minimum unit of the frame is reset. After the bit number is reset, the input of the synchronization pulses is waited for, and a timer is reset (step S3). After the timer is reset, it is determined whether or not the synchronization pulses are input (step S4), and when it is determined that the synchronization pulses are input (when it is determined as "Yes"), it is determined whether or not the synchronization pulses from synchronization control unit hardware 112 are wide pulses P2 (step S5). When it is determined that the synchronization pulses are wide pulses P2 (when it is determined as "Yes"), frame counter 1011 is updated (step S6). That is, when wide pulses P2 appear, frame counter 1011 is updated. After the frame counter is updated, it is determined whether or not the frame number has a maximum value (step S7), and when it is determined that the frame number has the maximum value (when it is determined as "Yes"), the frame number is reset (step S8). Subsequently, the process returns to step S2. Meanwhile, in the determination of step S7, when it is determined that the frame number does not have the maximum value (when it is determined as "No"), the process returns to step S2.

In the aforementioned determination of step S5, when it is determined that the synchronization pulses from synchronization control unit hardware 112 are not the wide pulses P2 (when it is determined as "No"), it is determined whether or not the bit number exceeds half of the maximum value (step S9) thereof. When it is determined that the bit number does not exceed half of the maximum value thereof (when it is determined as "No"), the process proceeds to step S7, and it is determined whether or not the frame number has the maximum value as described above. Meanwhile, when it is determined that the bit number exceeds half of the maximum value thereof (when it is determined as "Yes"), the frame number is counted up by one (+1) (step S10). After the frame number is counted up, the process proceeds to step S7, and it is determined whether or not the frame number has the maximum value as described above. That is, in step S9, when the bit number is smaller than a number assigned to the center of the frame, it is determined that the frame number does not exceed half of the maximum value thereof, and the frame number is not counted up. When the bit number is greater than the number assigned to the center of the frame, it is determined that the frame number exceeds half of the maximum value thereof, and the frame number is counted up.

Meanwhile, in the aforementioned determination of step S4, when it is determined that the synchronization pulses are not input (when it is determined as "No"), the timer (bit counter 1012) is counted up by 1 (step S11). Thereafter, it is determined whether or not a value of the timer has the maximum value (step S12), and when it is determined that the value of the timer does not have the maximum value (when it is determined as "No"), the process returns to step S4, and it is determined whether or not the synchronization pulses are input. Meanwhile, when it is determined that the value of the timer has the maximum value (when it is determined as "Yes"), the bit number is counted up by 1 (step S13). Subsequently, it is determined whether or not the bit number has the maximum value (step S14), and when it is determined that the bit number does not have the maximum value (when it is determined as "No"), the process returns to step S3, the input of the synchronization pulses is waited for, and the timer is reset. When it is determined that the bit number has the maximum value (when it is determined as "Yes"), the process proceeds to step S10, and the frame number is counted up by 1. The loop of step S4, step S11, and step S12 is a loop of forming a 1-bit length, and step S3, step S4, step S11, step S12, step S13 and step S14 are a bit counter loop.

Figure 7:
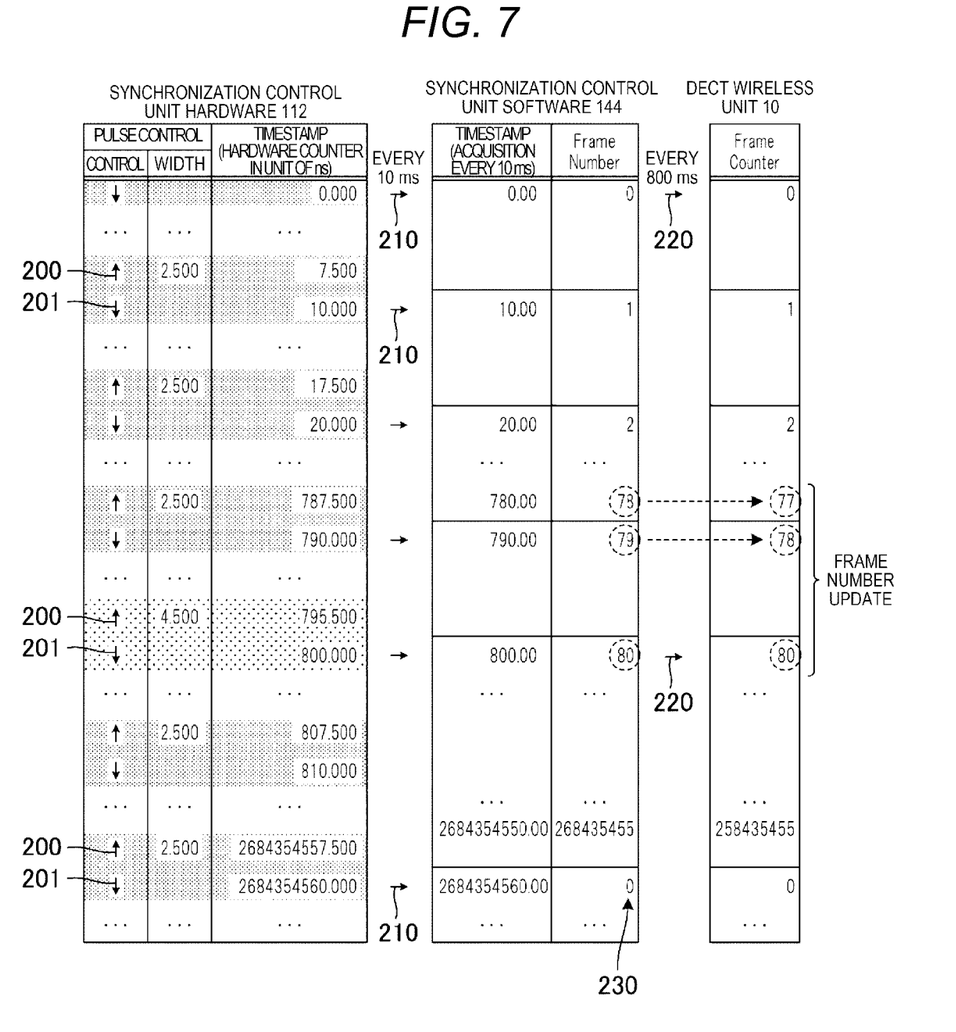
FIG. 7 is a diagram showing a process flow until the update of a frame counter from a timestamp in the slave base station device of the communication system of FIG. 1 occurs.

FIG. 7 is a diagram showing a process flow until the update of the frame counter from the timestamp in slave base station device 6-2 of communication system 1 of FIG. 1 occurs. In this drawing, pulse control arrows 200 of synchronization control unit hardware 112 of Ethernet PHY-LSI 11 indicate rising edges of interval pulses P1 and wide pulses P2, and arrows 201 indicate falling edges of interval pulses P1 and wide pulses P2. "2.500" indicates 2.5 msec which is the pulse width of interval pulse P1, and "4.500" indicates 4.5 msec which is the pulse width of wide pulse P2. The timestamp is a hardware counter in units of nsec (for simplification, numerical values in units of msec are only described in FIG. 7), and is counted up from "0.000". As described above, since the timestamp information is output from synchronization control unit hardware 112 every 10 msec, the timestamp information is output at the respective timings of 0.000 msec, 10.000 msec, 20.000 msec, . . . , as shown by right arrow 210.

Synchronization control unit software 144 of CPU 14 starts to generate the frame numbers that are counted up every 10 msec from zero of the timestamp. As shown by right arrows 220, the frame numbers are output to DECT wireless unit 10 every 800 msec (80 frames). Here, even though the frame number is deviated due to various causes, an abnormal frame number is updated using the frame numbers generated in the timestamp with wide pulses P2 (4.5-msec width) generated every 80 frames as the triggers, and the abnormal frame number becomes a normal frame number in DECT wireless unit 10. For example, as shown in this drawing, even though the frame numbers "78" and "79" in synchronization control unit software 144 are changed to "77" and "78" in DECT wireless unit 10, the frame counter is corrected to "80" at 80 frames=80 msec. As shown by reference number 230, the frame number expires at 28 bits according to the standard, and returns to zero.

As mentioned above, according to slave base station devices 6-2 and 6-3, synchronization control unit hardware 112 that is connected to Ethernet (registered trademark) 3, and outputs the timestamp information and the synchronization pulses which include interval pulses P1 and wide pulses P2 having a pulse width greater than that of the interval pulses, synchronization control unit software (frame number generating unit) 144 that generates the frame numbers based on the timestamp information, and wireless timing control unit 101 that receives the synchronization pulses generated in synchronization control unit hardware 112 and the frame numbers generated in synchronization control unit software 144, and performs the timing control for performing wireless communication with IP-DECT client terminals 7 are provided. Wireless timing control unit 101 includes frame counter 1011, and frame counter 1011 is updated using the frame numbers with wide pulses P2 included in the synchronization pulses as the triggers. Thus, the synchronization can be achieved in a wired manner between master base station device 6-1 and slave base station device 6-2 in the IP-DECT or between master base station device 6-1 and slave base station device 6-3, and it is possible to increase the distance between the base station devices. Accordingly, the number of used base station devices can be reduced, and it is possible to easily provide the base station devices.

In the aforementioned description, although it has been described that wide pulses P2 are detected as the triggers for updating frame counter 1011, the same effects can be obtained by generating and detecting predetermined detectable pulses such as pulses having a pulse width less than that of interval pulses P1.

Modification Example of Exemplary Embodiment

Figure 8:
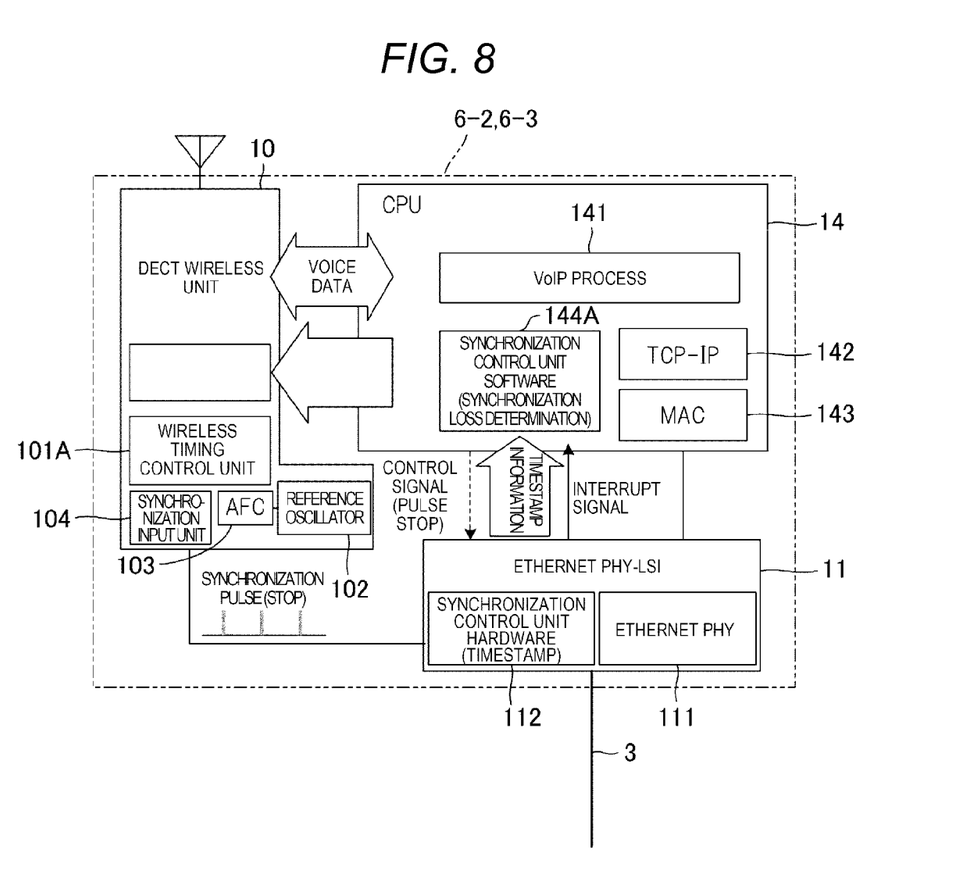
FIG. 8 is a block diagram for describing a modification example of the slave base station device of the communication system of FIG. 1.

FIG. 8 is a block diagram for describing a modification example of slave base station devices 6-2 and 6-3 of communication system of FIG. 1.

The present modification example is a slave base station device which is capable of continuing to operate using its own reference clocks through reference oscillator 102 even though the synchronization pulses are not input, that is, is capable of maintaining the timing relationship with master base station device 6-1 for a predetermined period of time and to maintain a handover function even though the synchronization pulses are no more supplied to DECT wireless unit 10 during the self-running mode. There may be a case where the synchronization pulses are not obtained. For example, a network environment may become worse due to, for example, a large load, and thus, it may be difficult to achieve synchronization via the network in some cases.

In the present modification example, when the network environment worsens, if synchronization control unit software 144A of CPU 14 detects synchronization loss, the output of the synchronization pulses to Ethernet PHY-LSI 11 is stopped. Wireless timing control unit 101A of DECT wireless unit 10 continues to operate in a self-running mode with its own reference clocks through reference oscillator 102 for a period during which the synchronization pulses are not input.

Figure 9:
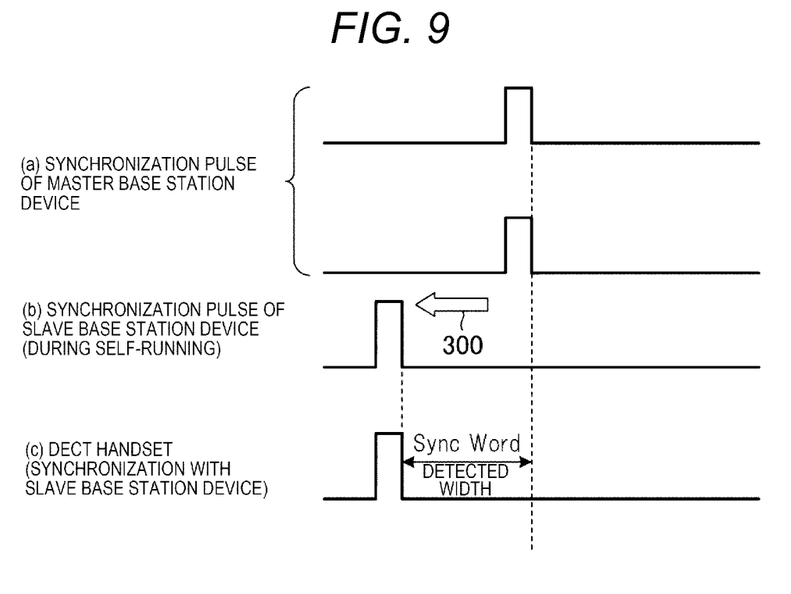
FIG. 9 is a diagram for describing a self-running mode at the time of a synchronization failure in the slave base station device of the communication system of FIG. 1.

Next, a failure when slave base station devices 6-2 and 6-3 operate in the self-running mode will be described. FIG. 9 is a diagram for describing the self-running mode at the time of a synchronization failure in slave base station devices 6-2 and 6-3. (a) of FIG. 9 shows a synchronization pulse in master base station device 6-1, (b) of FIG. 9 shows a synchronization pulse in slave base station devices 6-2 and 6-3, and (c) of FIG. 9 is a pulse in a DECT handset (IP-DECT client terminal 7). When slave base station devices 6-2 and 6-3 start to operate in the self-running mode, the timings thereof are gradually deviated (in the direction shown by arrow 300) from the timing of master base station device 6-1 due to a deviation in the reference clocks controlled through AFC. Even in the self-running mode, when the timing deviation from master base station device 6-1 falls within a detected width of a syncword (word for synchronization detection) of the DECT handset, handover of the DECT handset can be performed. When the timing deviation does not fall within the detected width of the syncword, it may be difficult to perform the handover. When it is difficult to perform the handover, a light-emitting diode provided in state display unit 13 is lighted in red, for example.

A predetermined time until which it may be difficult to perform the handover after the self-running modes of slave base station devices 6-2 and 6-3 are started can be predicted using the maximum deviation of AFC 103. The handover function is maintained for the predetermined time. Even though the predetermined time has elapsed, when the synchronization through the network is not restored, the display indicating synchronization abnormality is performed on slave base station devices 6-2 and 6-3, and the handover function is stopped.

Figure 10:
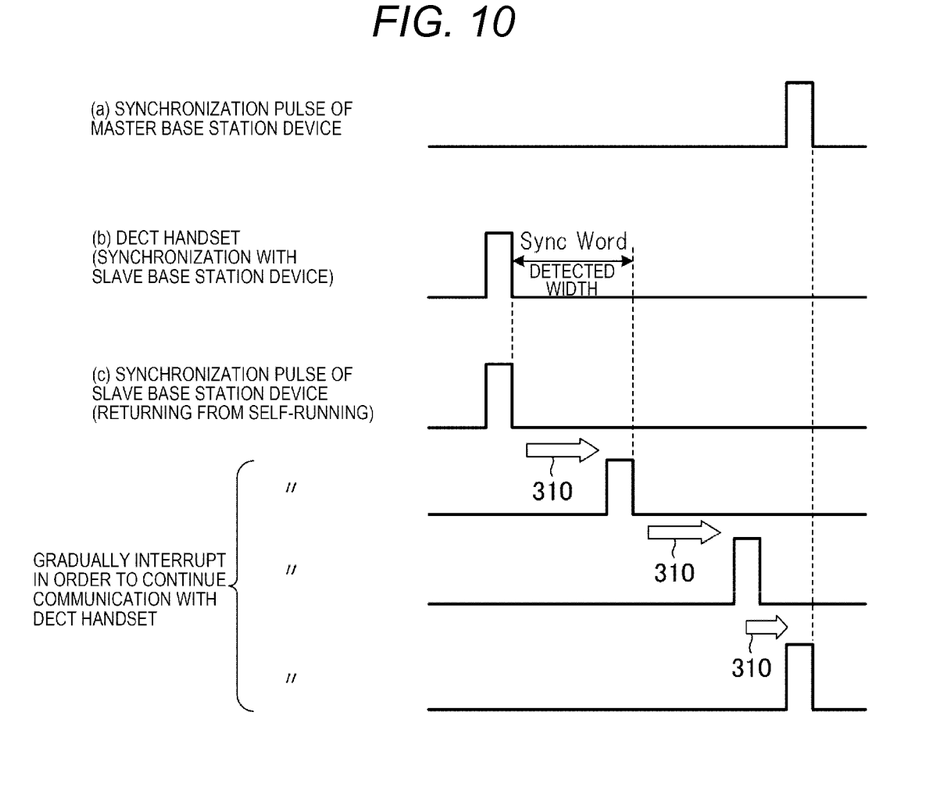
FIG. 10 is a diagram for describing a recovery from the self-running mode at the time of the synchronization failure in the slave base station device of the communication system of FIG. 1.

Next, the restoration from the self-running mode at the time of the synchronization failure in slave base station devices 6-2 and 6-3 will be described. FIG. 10 is a diagram for describing the restoration from the self-running at the time of the synchronization failure in slave base station devices 6-2 and 6-3. (a) of FIG. 10 shows a synchronization pulse in master base station device 6-1, (b) of FIG. 10 shows a pulse in the DECT handset, and (c) of FIG. 10 shows a synchronization pulse in slave base station devices 6-2 and 6-3.

When the synchronization through the network is restored, synchronization control unit hardware 112 of each of slave base station devices 6-2 and 6-3 restarts to transmit the synchronization pulses. DECT wireless unit 10 of each of slave base station devices 6-2 and 6-3 synchronizes the timing with the restarted input of the synchronization pulses. However, if the timing is synchronized at a time, when the DECT handset is used during communication, the communication is interrupted without being maintained. Here, even after the synchronization pulses are transmitted again, when the DECT handset is used during communication, the timing correction rate in slave base station devices 6-2 and 6-3 is maintained at a rate that can maintain the communication. Specifically, the timings of slave base station devices 6-2 and 6-3 are synchronized with the input pulses at a rate that does not exceed the detected width of the syncword of the DECT handset per one communication frame (10 msec) of DECT (in the direction shown by arrow 310).

As stated above, in the present modification example, since the slave base station devices operate in the self-running mode with their own reference clocks through reference oscillator 102 and AFC 103, even when the network environment worsens, the timing relationship with master base station device 6-1 is maintained for a predetermined period of time, and thus, it is possible to perform the handover between the base station devices.

What is claimed is:

1. A base station device comprising:
   communication circuitry which, in operation, establishes a wired connection with a master base station device to perform synchronization with the master base station device; and
   processing circuitry which, in operation:
      generates timestamp information and synchronization pulses based on the synchronization with the master base station device, wherein the synchronization pulses include interval pulses and trigger pulses having a pulse width different from that of the interval pulses;
      generates frame numbers based on the timestamp information;
      updates a frame counter based on a bit counter;
      updates the frame counter, in response to the trigger pulse, to indicate the frame number corresponding to a timing of the trigger pulse; and
      performs timing control for performing wireless communication with a client terminal based on the frame counter, wherein
      when the synchronization pulses are not supplied, the base station device operates in a self-running mode using a reference clock of the base station device, and
      when supply of the synchronization pulses is resumed, the base station device gradually returns from the self-running mode at a rate that does not allow a timing deviation with respect to the master base station device to exceed a threshold.

2. The base station device of claim 1, wherein the trigger pulses have a cycle greater than that of the interval pulses.

3. The base station device of claim 1, wherein the processing circuitry, in operation, resets the bit counter in response to the synchronization pulse.

4. The base station device of claim 1, wherein when the timing deviation with respect to the master base station device exceeds the threshold, an abnormal state is displayed.

5. The base station device of claim 1, wherein when synchronization loss with respect to the master base station device is detected, the processing circuitry stops outputting the synchronization pulses.

6. A method of updating a frame counter of a base station device, the method comprising:
establishing a wired connection between the base station device and a master base station device to perform synchronization therebetween;
generating timestamp information and synchronization pulses based on the synchronization between the base station device and the master base station device, wherein the synchronization pulses include interval pulses and trigger pulses having a pulse width different from that of the interval pulses;
generating frame numbers based on the timestamp information;
updating a frame counter based on a bit counter;
updating the frame counter, in response to the trigger pulse, to indicate the frame number corresponding to a timing of the trigger pulse;
performing timing control for performing wireless communication with a client terminal based on the frame counter;
when the synchronization pulses are not supplied, operating the base station device in a self-running mode using a reference clock of the base station device, and
when supply of the synchronization pulses is resumed, gradually returning from operating the base station device in the self-running mode at a rate that does not allow a timing deviation with respect to the master base station device to exceed a threshold.

7. The method of claim 6, wherein the trigger pulses have a cycle greater than that of the interval pulses.

8. The method of claim 6, comprising:
resetting the bit counter in response to the synchronization pulse.

9. The method of claim 8, comprising:
when the timing deviation with respect to the master base station device exceeds the threshold, displaying an abnormal state.

10. The method of claim 6, comprising:
when synchronization loss with respect to the master base station device is detected, stopping the synchronization pulses.

* * * * *